United States Patent
Ha et al.

(10) Patent No.: US 6,593,979 B1
(45) Date of Patent: Jul. 15, 2003

(54) LIQUID CRYSTAL DISPLAY MODULE, LIQUID CRYSTAL DISPLAY DEVICE EMPLOYING THE SAME, AND ASSEMBLY METHOD THEREOF

(75) Inventors: Jin-Ho Ha, Yong-in (KR); Ick-Hwan Lee, Yong-in (KR); Sang-Duk Lee, Yong-in (KR); Yoon-Soo Kwon, Yong-in (KR); Jung-Tae Kang, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 282 days.

(21) Appl. No.: 09/680,306

(22) Filed: Oct. 6, 2000

(30) Foreign Application Priority Data

Oct. 8, 1999 (KR) .......................................... 1999/43451

(51) Int. Cl.[7] ..................... G02F 1/1333; G02F 1/1335; G01D 11/28; F21V 7/04
(52) U.S. Cl. .............................. 349/58; 349/56; 349/60; 349/61; 349/187; 362/26; 362/31
(58) Field of Search ........................... 349/58, 61, 187, 349/60; 362/26, 31

(56) References Cited

U.S. PATENT DOCUMENTS

| | | | | | |
|---|---|---|---|---|---|
| 6,166,788 | A | * | 12/2000 | Ha et al. | 345/905 |
| 6,175,396 | B1 | * | 1/2001 | Kim et al. | 349/58 |
| 6,219,116 | B1 | * | 4/2001 | Yuuki et al. | 349/58 |

* cited by examiner

Primary Examiner—Robert H. Kim
Assistant Examiner—Jeanne A. Di Grazio
(74) Attorney, Agent, or Firm—McGuireWoods LLP; Hae-Chan Park

(57) ABSTRACT

In the packaging of an LCD module within a small and lightweight case, the case comprising a front case and a rear case, a recess with a predetermined depth, formed at the edge of the bottom side of the LCD module, is combined with a boss formed at the case, and a recess with a predetermined depth, formed at the edge of its surface, is fastened to a fastening means for securing the LCD module, thereby minimizing the difference between the areas of the LCD module and the case and further reducing the number of processes required for combining the LCD module with the case. In addition, the recess formed at the surface edge of the LCD module is combined with a fastening hook formed at the rear case so that the LCD module can be secured to the rear case and to the front case without any separate fastening member such as a stud or insert.

23 Claims, 17 Drawing Sheets

LIQUID CRYSTAL DISPLAY MODULE, LIQUID CRYSTAL DISPLAY DEVICE EMPLOYING THE SAME, AND ASSEMBLY METHOD THEREOF

BACKGROUND OF THE INVENTION

1. Field of the Invention

The present invention relates to an information display and, more particularly, to a liquid crystal display (LCD) module, an LCD device and an assembly method thereof, by which, when the LCD module, that is one of display devices for displaying information, is combined with a case to be accommodated therein, the difference between the area of the LCD module and that of the case is minimized.

2. Description of the Related Art

A liquid crystal display (LCD) that has been rapidly developed recently has a remarkably reduced weight and volume compared to a cathode ray tube (CRT) display with the same effective display area as that of the LCD and it also has a high resolution similar to that of the CRT-type display. Owing to these advantages, the LCD is being highly used with desktop computers and wall-mounted TVs as well as notebook computers. The LCD for achieving the above various advantages needs a technique of manufacturing an LCD module in a thin and compact construction together with a technique of packaging the LCD module in a case to form an LCD apparatus.

Although elements constructing the LCD module become thin due to intensive efforts to realize a thin LCD module, however, the packaging technique required for securing the LCD module to the case does not keep up with the technique of thinning the LCD module. Thus, when the LCD module is packaged in the case through a conventional method, the difference between the area of the LCD module and that of the case becomes large. This impedes the realization of a thin LCD apparatus.

SUMMARY OF THE INVENTION

It is, therefore, an object of the present invention to securely combine the LCD module with the case and to minimize the difference between the areas of them.

Another object of the present invention is to minimize the number of constituent elements and the number of processing steps required for the combination of the LCD module and the case while minimizing the difference between the areas of them.

The objectives and other advantages of the invention will be realized and attained by the structure particularly pointed out in the written description and claims hereof as well as the appended drawings.

To accomplish the objects of the present invention, a plurality of first locking depressions with a predetermined depth are formed at the edge of the top side of an LCD module in the shape of a thin cuboid in a predetermined interval and a plurality of second locking depressions are formed at portions of the edge of the back side of the LCD module, corresponding to the positions of the first locking depressions. Bosses are formed at portions of the rear case, corresponding to the positions of the second locking depressions, to be fastened to the second locking depressions of the LCD module, such that the LCD module cannot move horizontally. In addition, to prevent the LCD module from moving upward from the rear case, a screw locking hole is formed at a portion of the boss, corresponding to the outside of the second locking depression, and a screw is combined with the screw locking hole with the head of the screw being captured in the first locking depression, to thereby securely fix the LCD module to the rear case and combine the rear case and front case with each other.

In a preferred embodiment of the present invention, the first and second locking depressions of the LCD module are formed at portions of the edge of a mold frame, the portions of the edge of the mold frame being exposed to the outside without being covered by signal processing/transmitting members constituting a display unit that is one of constituent elements of the LCD module when the display unit is mounted on the mold frame.

In another embodiment of the invention, a screw having no head is used instead of the screw simultaneously fastened to the first locking depression and the boss. The screw having no head is fastened to the boss and then fit in a nut, such that the first locking depression of the LCD module is tightly secured to the bottom of the rear case with the help of the nut.

To reduce the number of parts and processing steps required for assembling the LCD module and the case, without using the screw combining the first locking depression and the boss with each other, a double protrusion is formed at a front case fastened to the rear case such that the double protrusion presses the first locking depression of the LCD module and is tightly fit in the through hole of the boss, simultaneously, in the step of combining the front case and rear case with each other with the second locking depression of the LCD module and the boss being fastened to each other, thereby remarkably reducing the number of processes required for packaging the LCD module in the case.

DETAILED DESCRIPTION OF THE PREFERRED EMBODIMENT

Reference will now be made in detail to the preferred embodiments of the present invention, examples of which are illustrated in the accompanying drawings. There will be explained below an LCD module, an LCD device employing the LCD module and an assembly method thereof in accordance with the invention with reference to the attached drawings.

First of all, the LCD uses liquid crystal whose light transmittance varies with an electric field applied thereto. Specifically, the LCD is constructed in such a manner that the liquid crystal is inserted and sealed between an upper transparent substrate having a conductive thin film formed thereon, to which predetermined electric power is applied, and a lower transparent substrate divided into a plurality of sections to which electric power is selectively applied to form an electric field between the upper and lower transparent substrates. With this construction, when electric field is formed between the two transparent substrates, the orientation angle of the liquid crystal is changed according to the direction and magnitude of the electric field to thereby block or pass light incident on the liquid crystal.

Figure 1:
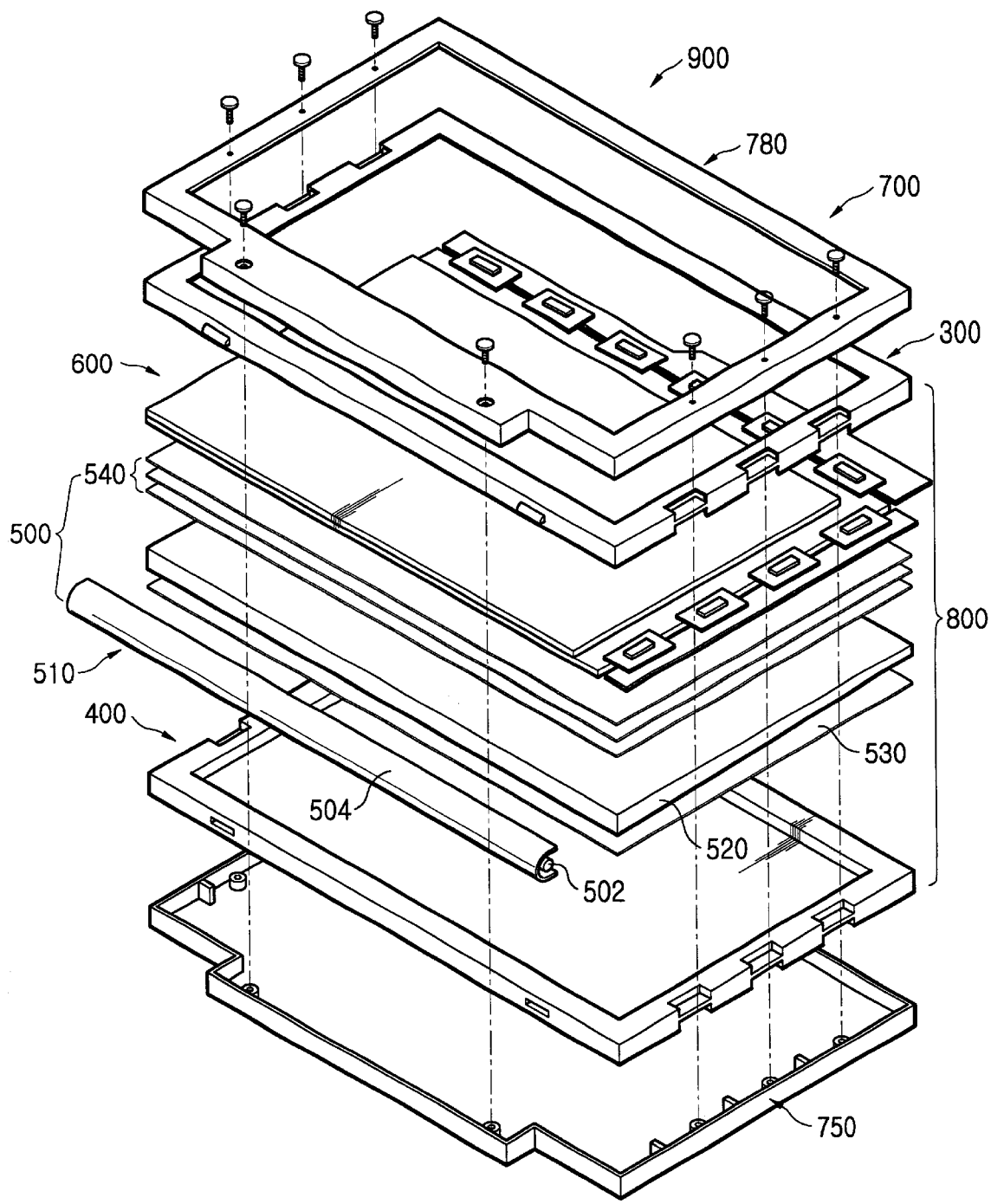
FIG. 1 is an exploded perspective view for explaining a preferred embodiment of an LCD in accordance with the present invention.
Figure 2:
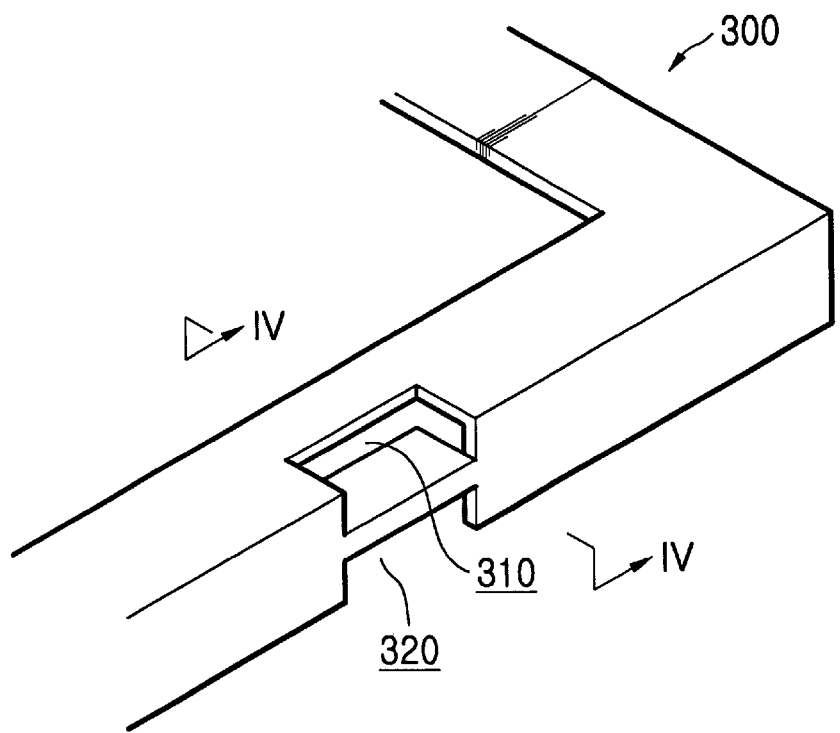
FIG. 2 is a partial perspective view showing a part of a chassis that is one of constituent elements of the LCD in accordance with the present invention.
Figure 3:
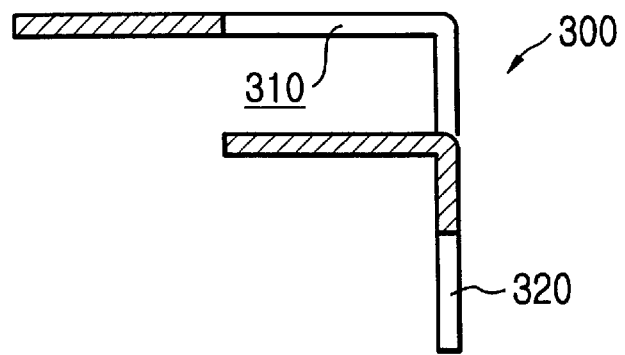
FIG. 3 is a cross-sectional view of FIG. 2.

With the arrangement that the electric field is created between the upper and lower transparent substrates to allow the liquid crystal to be able to pass light incident thereon, a light source is placed under the lower transparent substrate and a color filter revealing predetermined colors under the stimulus of light which has passed through the liquid crystal layer is attached to the upper transparent substrate. In this construction, upon turning on the light source, the light generated by the light source sequentially passes through the lower transparent substrate, light crystal, upper transparent substrate and color filter to reveal a predetermined color so that a user can perceive the color filtered while passing the color filter. The LCD electrically controls the liquid crystal creating the above phenomenon exclusively to allow the user to recognize image information on the basis of display signals in an electrical form. FIG. 1 shows an embodiment of a configuration for realizing an LCD in accordance with the invention. Referring to FIG. 1, an LCD 900 includes an LCD module 800, a case 700 and a means for combining the LCD module 800 and case 700 with each other with a minimized difference between the areas of them. The LCD module 800 consists of a display unit 600 controlling the orientation of liquid crystal to vary its light transmittance, a backlight assembly 500 located under the display unit 600 to supply light to the display unit 600, a container 400 called a mold frame accommodating the display unit 600 and backlight assembly 500, and a chassis 300 for combining the display unit 600 and backlight assembly 500 with each other. The case 700 consists of a rear case 750 accommodating the LCD module 800 and a front case 780 combined with the rear case 750.

Figure 4:
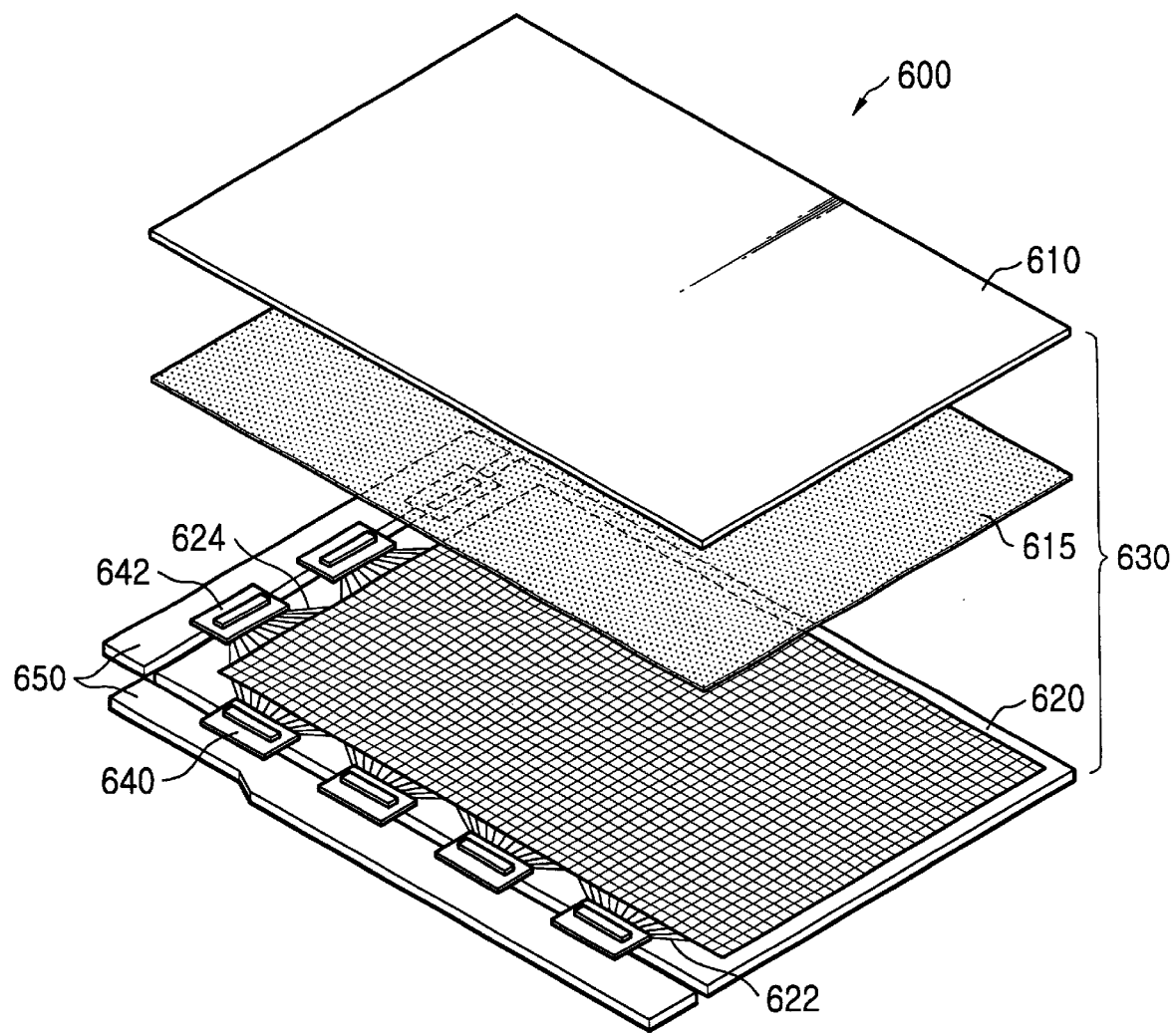
FIG. 4 is an exploded perspective view of a display unit that is one of constituent elements of the LCD in accordance with the present invention.

The LCD module 800 will be specifically described hereinafter with reference to the attached drawings. FIG. 4 shows the display unit 600 that is one of the constituent elements of the LCD module 800. The display unit 600 includes an LCD panel 630 that are signal processing/transmitting members 640 and 642, and a driving printed circuit board 650. More specifically, the LCD panel 630 has a TFT substrate 620, a color filter substrate 610 and a polarizing plate (not shown) attached to both of the bottom surface of the TFT substrate 620 and the top surface of the color filter substrate 610.

The color filter substrate 610 is preferably configured of a transparent substrate such as a glass substrate. Hundreds to millions of optical filters, i.e., RGB pixels (not shown) in a matrix arrangement and a common electrode formed of indium tin oxide (ITO) (not shown) having transparent, low-resistant and conductive characteristics are formed on the glass substrate through semiconductor thin film processes. The TFT substrate 620 opposes the color filter substrate 610, having liquid crystal 615 interposed between them with a predetermined thickness. Specifically, the TFT substrate 620 is constructed in such a manner that hundreds to millions of thin film transistors (TFTs) each of which has a source, gate and drain, gate lines, data lines and pixel electrodes are formed on one side of a transparent substrate, preferably, a glass substrate through the semiconductor thin film processes.

More specifically, the source of each TFT is connected to a data line 622 extended to one edge of the TFT substrate 620 while its gate is connected to a gate line 624 which is perpendicular to the data line 622, extended to the edge of one of both sides of the TFT substrate 620 and provided with a gate driving signal for turning on the TFTs. Further, the drain of each TFT is connected to the pixel electrode (not shown) which opposes the common electrode. The pixel electrode is formed of ITO and provided with power when a corresponding TFT is turned on according to the driving signal applied to corresponding gate and data lines. Here, a predetermined number of the data lines 622 among the data lines extended to one edge of the TFT substrate 620 form at least one group. This is defined as a data line group. A predetermined number of the gate lines 624 also form at least one group defined as a gate line group.

The liquid crystal 615, being inserted between the pixel electrodes and the common electrode to block light from the TFT substrate 620 or pass it through the color filter substrate 610 according to the electric field created between the pixel electrodes and the common electrode, does not only simply pass or block the light but also continuously controls its light transmittance, corresponding to the intensity of the electric field. This enables full-color display of colors, which have passed the color filter substrate 610. To realize this full-color display, the electric field created between the pixel electrodes and common electrode is determined by the magnitude of a voltage applied to the data line 622, i.e., a gray-scale voltage, and this gray-scale voltage is determined by an image signal applied from an external display device.

A predetermined level of gray-scale voltage is applied to the pixel electrodes to create the electric field between the pixel electrodes and the common electrode to thereby arrange the liquid crystal only under the condition that corresponding TFTs are turned on with the gray-scale voltage being applied to the gate line. Thus, a turn-on signal for turning on the TFTs must be applied to the data line 622. In other words, at least the gray-scale voltage and the turn-on signal are required for revealing a desired color through the color filter substrate 610. These signals are generated and processed by the driving printed circuit board 650 connected to an external information processor (not shown).

Meanwhile, even when the gray-scale voltage and the turn-on signal were generated and processed to drive the liquid crystal, if the liquid crystal 615 is driven without any control, an image the user wants to see cannot be displayed. This means that a means for controlling the driving signals generated by the driving printed circuit board 650 is needed. To realize this means, all of the gate lines 624 are connected to the gate signal processing/transmitting members 642 which process the turn-on signal applied to the gate lines 624 and determine the point of time at which the turn-on signal is inputted into the gate lines 624, and all of the data lines 622 are connected to the data signal processing/transmitting members 640 which determine the point of time at which the gray-scale voltage that has been individually applied to each data line 622 is inputted into the data line 622.

The gate signal processing/transmitting member 642 and data signal processing/transmitting member 640 are preferably configured of the Tape Carrier Package (TCP), Chip On Flexible circuit (COF) or Flexible Printed Circuit (FPC) which are widely known.

Even though the above-described display unit 600 constituting the LCD module 800 operates normally, colors cannot be brought out through the color filter substrate 610 when there is no external light source, that is, there isn't any light passing through the liquid crystal 615, because the liquid crystal itself is a non-luminescent light-receiving element. Thus, the LCD needs a light source. The light source may be an external light source. Especially, an inner light source is set inside the LCD to enable images to be displayed even at a place having a luminance lower than a predetermined luminance due to blocking out of external light.

The light source used for the LCD 800 must generate uniform light with a high luminance over a wide range. When a point light source or linear light source is employed without any variation, however, luminance concentration occurs around the light source but places distant from the light source become dark, resulting in non-uniformity of luminance. Accordingly, it is very difficult to obtain high luminance and luminance uniformity when the dot light source or linear light source is set under the display unit 600. To satisfy the uniform and high luminance condition required for the LCD 800 the assembly needs the backlight assembly 500 which improves luminance and uniformity of light.

The backlight assembly 500 consists of a lamp unit 510, a light guiding plate 520, a reflective plate 530 and diffusion sheets 540, as shown in FIG. 1. In an embodiment, the lamp unit 510 is configured of a lamp 502 in a cold CRT mode and a lamp cover 504 concentrating light radiating from the lamp 502 on one direction to improve its luminance. The light guiding plate 520 changes the direction of the concentrated light to allow it to pass through the TFT substrate 620, liquid crystal 615 and color filter substrate 610 of the aforementioned display unit 600 and, simultaneously, makes the luminance unifonm The reflective plate 530, placed under the light guiding plate 520 and formed from thin material having excellent light reflexibility, reflects light leaking from the light guiding plate 520 thereto to improve the luminance more. The diffusion sheets 540, which are at least three, disperse the light before it enters the display unit 600 from the light guiding plate 520, making the luminance uniform once more. The lamp unit 510, light guiding plate 520, reflective plate 530 and diffusion sheets 540 are sequentially accommodated in the inner space of the container 400 called "mold frame."

Figure 7:
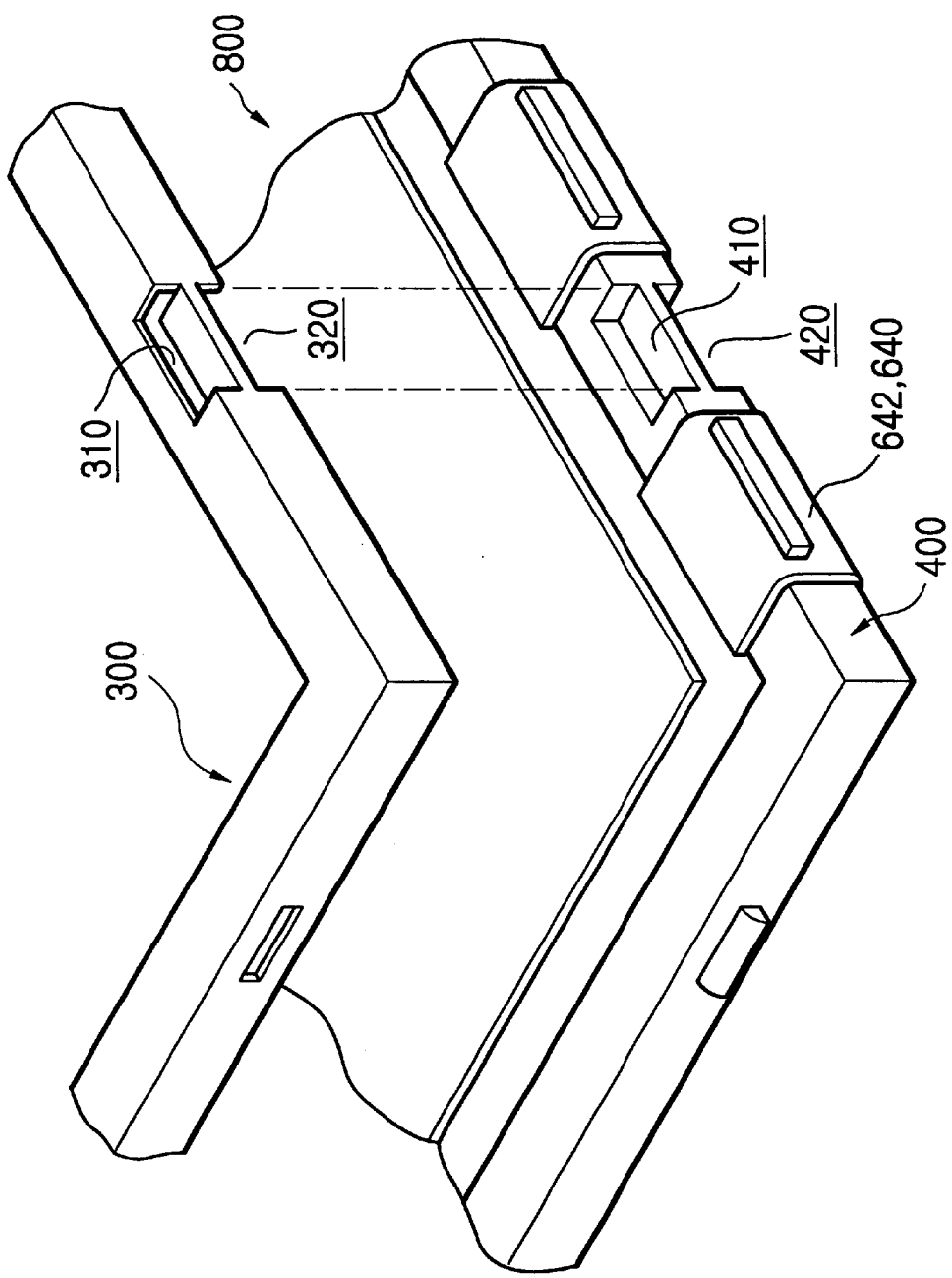
FIG. 7 is a perspective view showing a method of combining the chassis and mold frame which accommodates the display unit and backlight assembly, without detaching the display unit and backlight assembly from the mold frame, with signal processing/transmitting members of the display unit being bent toward the back side of the mold frame, in accordance with the present invention.

The display unit 600 is mounted on the diffusion sheets 540 accommodated in the mold frame and the signal processing/transmitting members 640 and 642 constituting the display unit 600 are bent toward the back side of the mold frame 400 together with the driving printed circuit board 650 in order to minimize the area of the LCD module 800, as shown in FIG. 7. The mold frame 400 accommodating the backlight assembly 500 and the display unit 600, described above in detail, is contained in the case 700 to directly come into contact with it and has a unique structure for minimizing the difference between the areas of the LCD module 800 and the case 700.

The shape and structure of the mold frame 400 are specifically described below with reference to FIGS. 1, 5 and 6.

The mold frame 400 has its topside that is open and an liner space capable of accommodating the constituent elements of the above-described backlight assembly. More specifically, the mold frame 400 has four sidewalls having a predetermined height and its bottom coupled to the four sidewalls. To make the display unit 600 and the backlight assembly 500 small and lightweight, the side walls and bottom of the mold frame 400 have been recently manufactured using frames that are so thin that it barely supports the display unit 600 and the backlight assembly 500. The thickness of the frame of the mold frame 400 directly affects the size of the LCD module.

Figure 5:
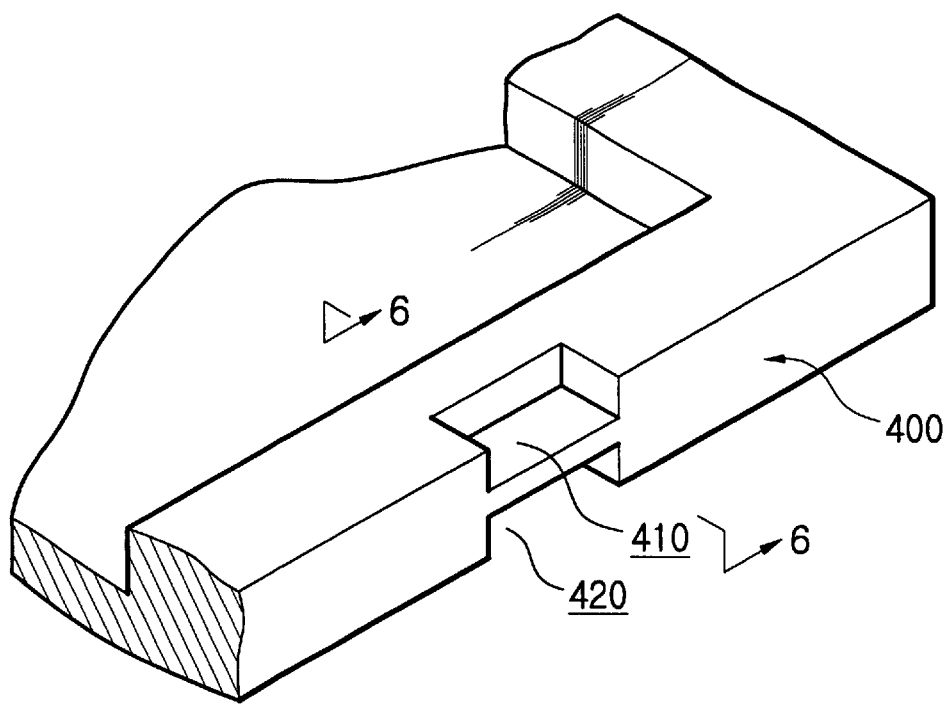
FIG. 5 is a partial perspective view of a mold frame that is a container for accommodating the LCD in accordance with the present invention.
Figure 6:
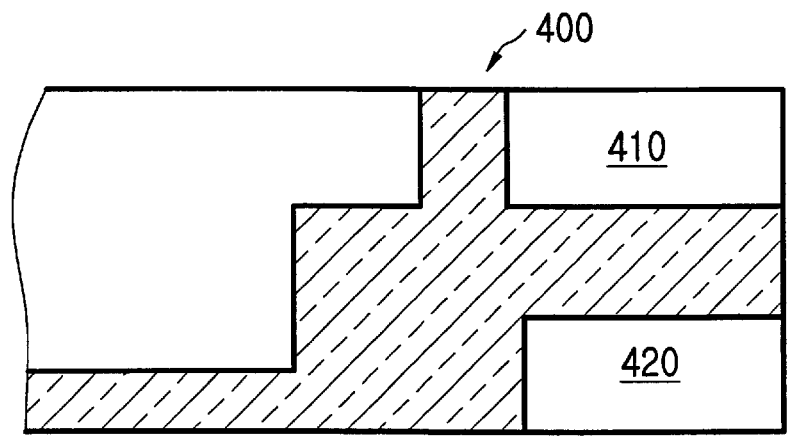
FIG. 6 is a cross-sectional view of the locking depression and movement preventing recess of FIG. 5.

With the signal processing/transmitting members 640 and 642 constituting the display unit 600 being bent toward the back side of the mold frame 400, a first locking depression 410 having a predetermined length and height is formed at the upper edge of the mold frame 400, corresponding to the portion between the signal processing/transmitting members 640 and 642 and their neighboring signal processing/transmitting members 640 and 642 of the display unit 600, as shown in FIGS. 5, 6 and 7. This first locking depression 410 is exposed from the side and top edge of the mold frame 400 to be seen. That is, the first locking depression 410 is formed at the portion covering the edge of the surface of the mold frame 400 to its outer side. Here, the locking depression 410 is formed at two or more of the four sidewalls of the mold frame 400. In addition, there is no restriction on the location of the first locking depression 410 formed at the edge of the mold frame 400 at which the signal processing/transmitting members 640 and 642 are not bent.

Furthermore, a second locking depression 420 whose shape is similar to that of the first locking depression 410 may be formed under the first locking depression 410, corresponding thereto. That is, it may be formed at the edge of the backside of the mold frame 400, at which the outer side and backside of the mold frame 400 meet each other. The second locking depression 420 is exposed from the outer side and back of the mold frame 400 to be seen. The function of the first and second locking depressions 410 and 420 will be described below in detail after explanation of the rear case 750 which will be also described below.

As described above, the reflective plate 530, light guiding plate 520, lamp unit 540 and optical sheets 540, which are constituent elements of the backlight assembly 500, are sequentially accommodated in the mold frame 400 having the first and second locking depressions 410 and 420. The chassis 300 covers the top of the display unit 600, being mounted on the optical sheets 540, in order to prevent it from being detached from the backlight assembly 500. The chassis 300 is secured to the mold frame 400 at the side edges of the mold frame 400 by means of a fastening member such as a hook.

To keep the display unit 600 from being detached from the mold frame 400, the chassis 300 is in contact with the top of the display unit 600 and simultaneously comes into contact with the side edges of the mold frame 400. The chassis 300 is formed from steel material and has the form of "L-shaped bracket." When the chassis 300 having this shape is combined with the mold frame 400, the first and second locking depressions 410 and 420 of the mold frame 400 are covered with the chassis 300 to lose their functions. Accordingly, to expose the first and second locking depressions 410 and 420 to the outside of the LCD module, the portion of the chassis 300, corresponding to the first and second locking depressions 410 and 420, is partially cut and this cut portion is bent toward the first and second locking depressions 410 and 420, covering them. Reference numeral 310 denotes the portion exposing the first locking depression 410 and 320 denotes the portion exposing the second locking depression 420.

In exposure of the second locking depression 420 to the outside of the LCD module, especially, it is preferable that the partially cut portion of the chassis 300 covers the first locking depression 410, such that the chassis 300 formed from steel material with a high degree of strength strengthens the hardness of the mold frame 400 formed from relatively weak plastics.

The LCD module 800 having the construction described above is combined with the case 700, accomplishing the LCD apparatus 900.

Figure 9:
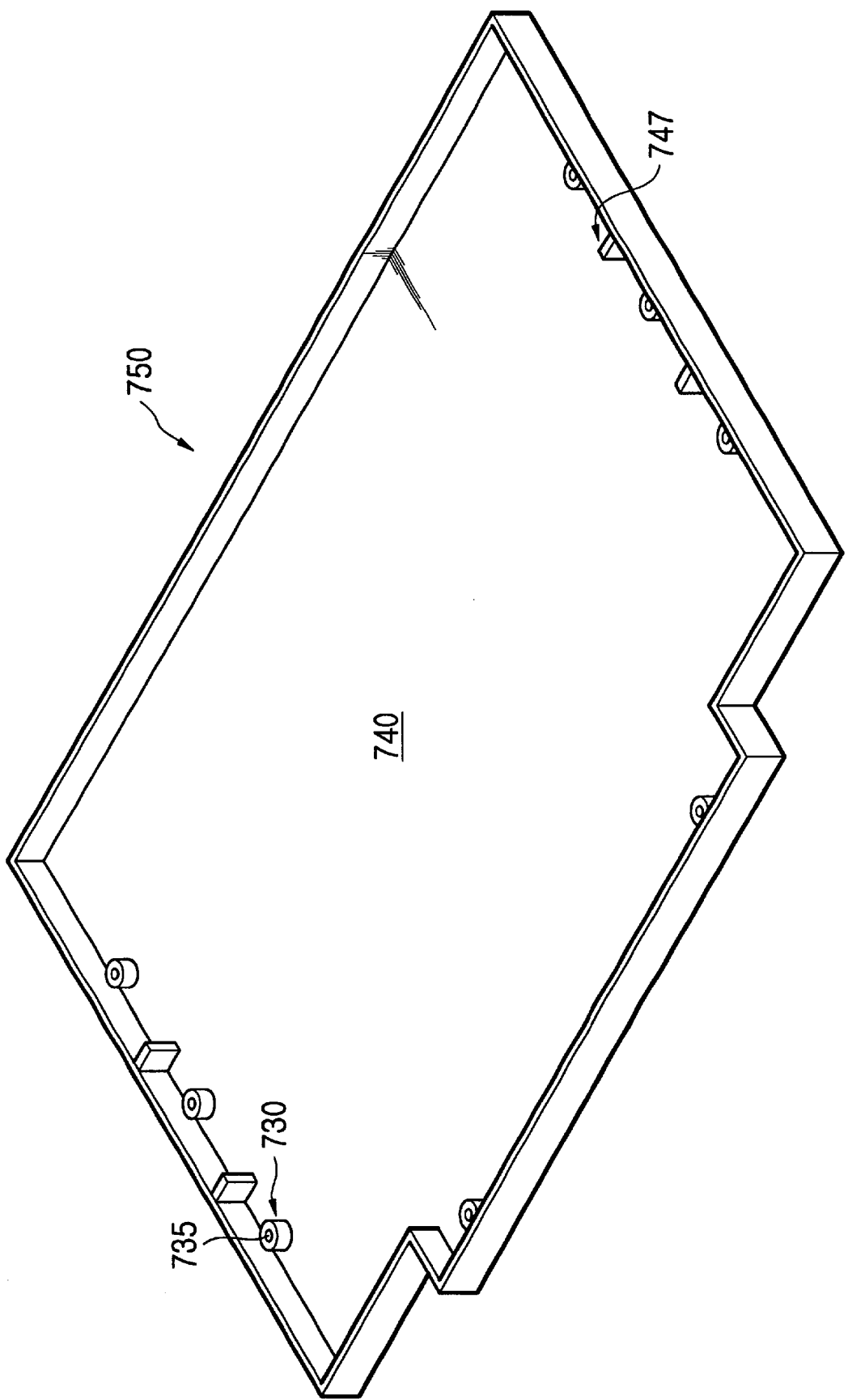
FIG. 9 is a perspective view of a rear case in accordance with the present invention.

The case 700 consists of the rear case 750 to which the LCD module 800 is secured and the front case 780 which is combined with the rear case 750 and has an opening for defining an effective display area of the display unit 600 of the LCD module 800. Referring to FIG. 9, the rear case 750 has a shape of thin cuboid having no topside. That is, it has four sides supporting the four sidewalls of the LCD module 800 and the bottom on which the LCD module 800 is mounted. Preferably, the rear case 750 is formed from magnesium compound metal in order to remove static electricity generated at the LCD module 800. The rear case 750 having this shape is explained in more detail with reference to FIGS. 1 and 9.

The rear case 750 has a rear case boss 730 with a predetermined shape, formed at the inner bottom 740 thereof. Specifically, the rear case boss 730 is formed at a portion corresponding to the movement preventing recess 420 (shown in FIG. 7) when it is being inserted into the LCD module 800. The rear case 750 also has a rib 747 protruded from the inner sidewalls thereof. The rib 747 presses the sides of the LCD module together with the rear case boss 730 to restrict horizontal movement of the LCD module on the rear case 700. In another embodiment, at least two ribs 747 may be protruded from the bottom of the rear case 750 to come into contact with the bottom of the mold frame 400 to restrict horizontal movement thereof.

Figure 10:
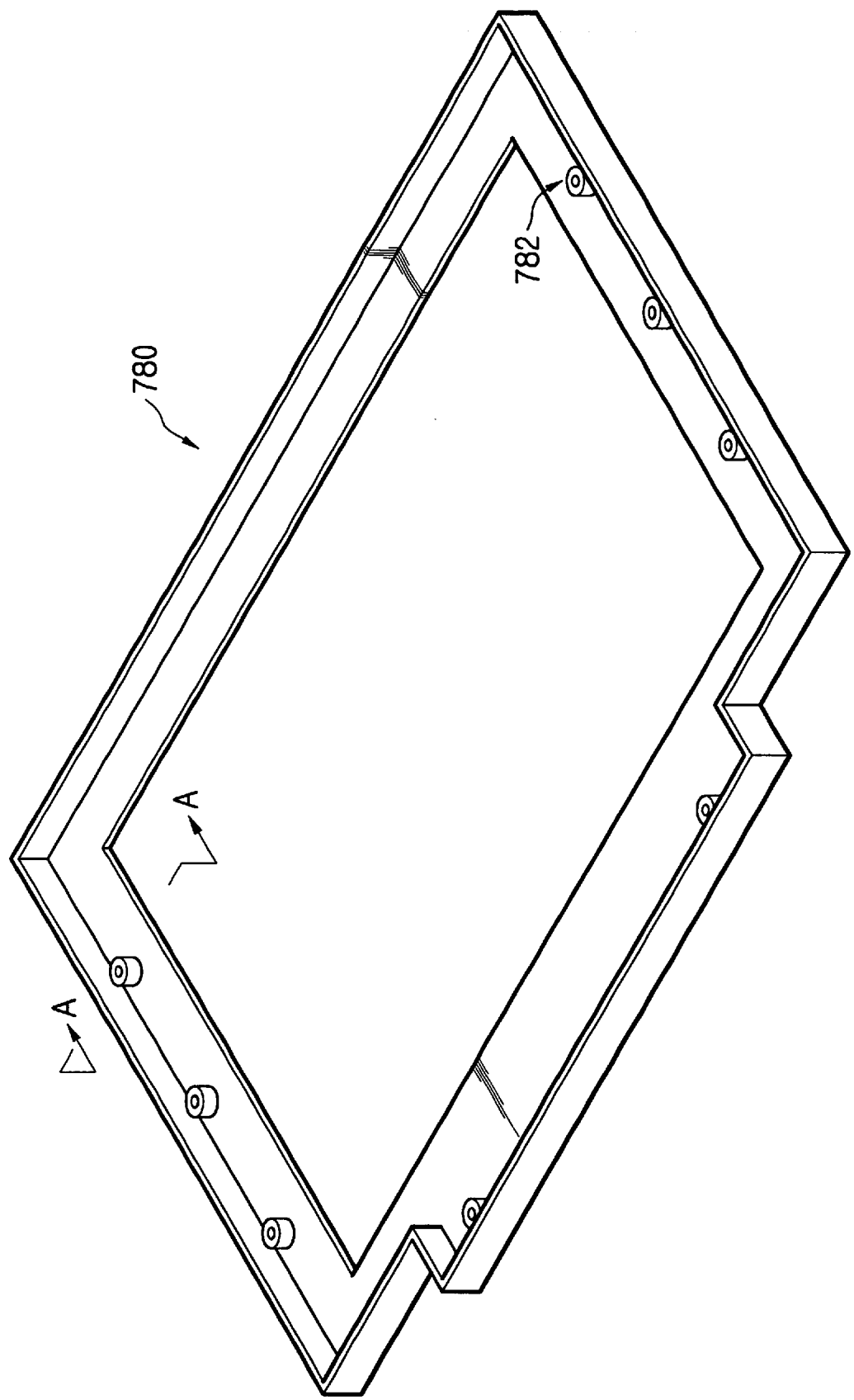
FIG. 10 is a perspective view showing the rear side of the front case shown in FIG. 1.

The rear case boss 730 has the same height as that of the second locking depression 420. In an embodiment, the boss 730 is in a cylindrical shape and has a hollow with a predetermined depth, without reaching the bottom of the rear case 750. Here, the position of the rear case boss 730 is considerably important. Referring to FIG. 10, the rear case boss 730 is located in a manner that the hollow 735 is exposed to the outside when the rear case boss 70 is fastened to the second locking depression 420 and a part surrounding the hollow comes into contact with the inner side of the second locking depression 420. Preferably, the center of the hollow 735 is aligned with the side of the chassis 300 on a straight line. The rear case boss 730 is fastened to the second locking depression 420 to prevent the LCD module 800 from horizontally moving on the bottom of the rear case 750.

Figure 11:
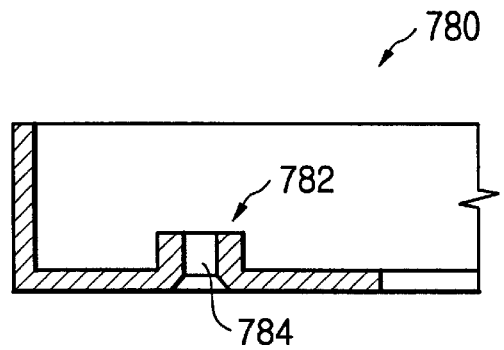
FIG. 11 is a cross-sectional view taken along the line A—A of FIG. 10.
Figure 12:
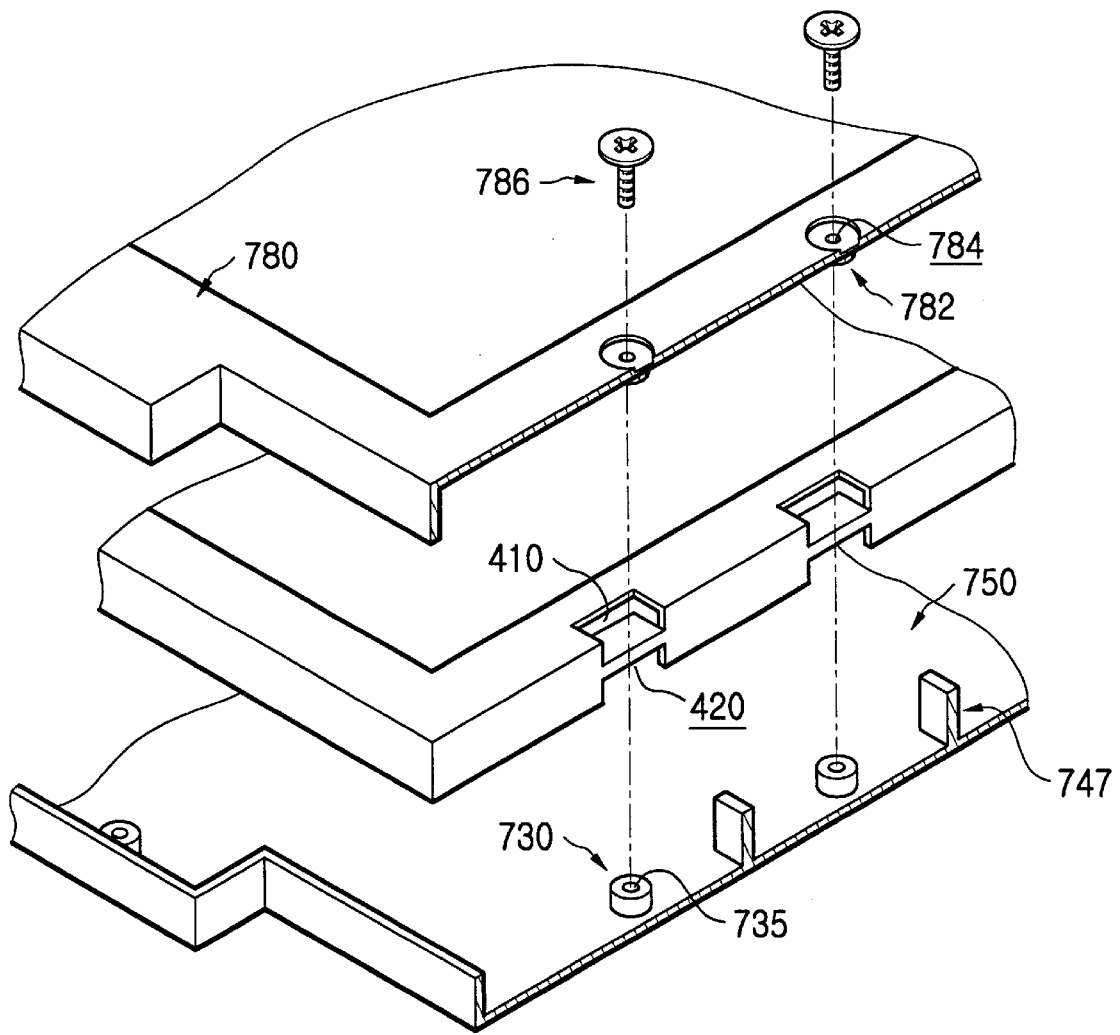
FIG. 12 is an exploded view showing an embodiment of combination of the LCD module with the rear case and front case in accordance with the present invention.
Figure 13:
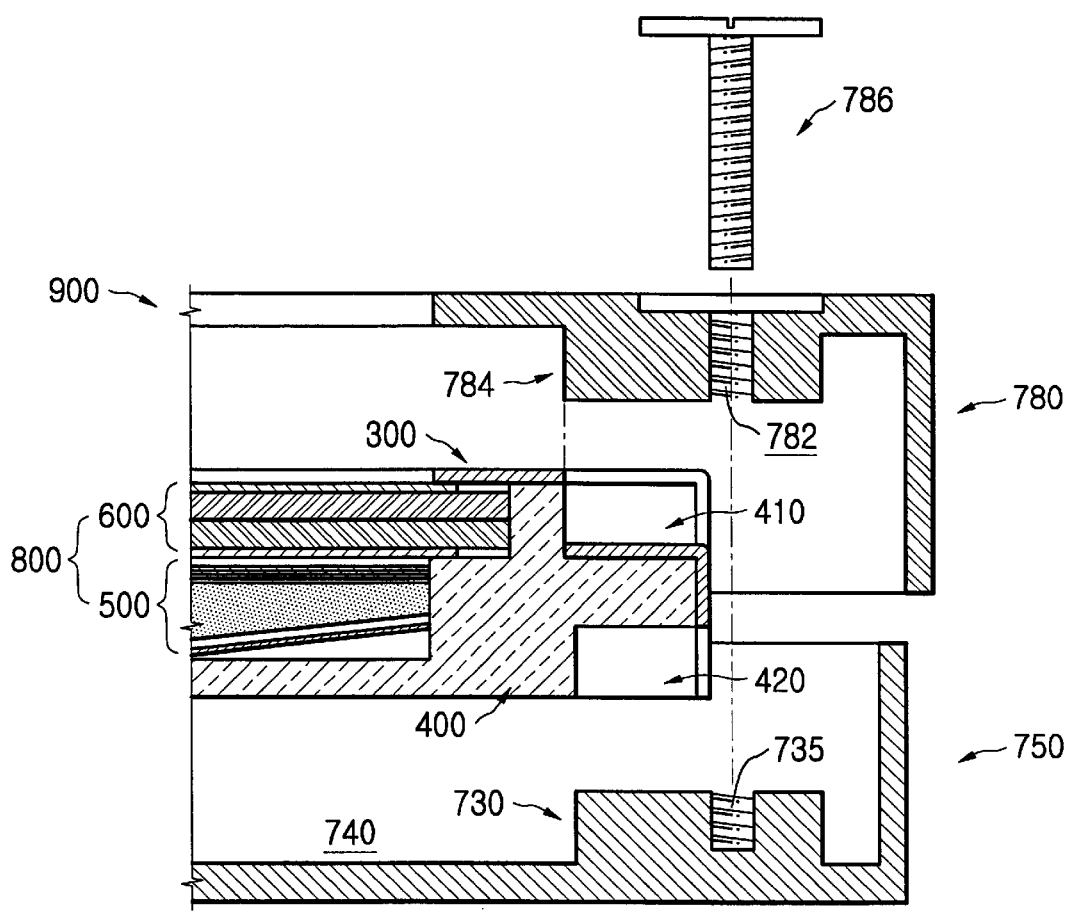
FIG. 13 is a cross-sectional view of FIG. 12.

Although the movement of the LCD module 800 of which is on the bottom of the rear case 750 is restricted due to the rear case boss 730 and second locking depression 420, it is movable upward from the bottom 740 (shown in FIG. 9) of the rear case 750. To restrict this upward movement of the LCD module 800, a plurality of front case bosses 782 are formed at the inner bottom of the front case 780, as shown in FIGS. 10 to 14. Referring to FIGS. 11 and 13, the front case boss 782 has a shape similar to that of the rear case boss 730 but has a through hole 784 penetrating it at the center of thereof. The inner side of the through hole 784 has a female screw portion formed thereon by means of tapping process, and a fastening screw 786 is fastened with the female screw.

Figure 14:
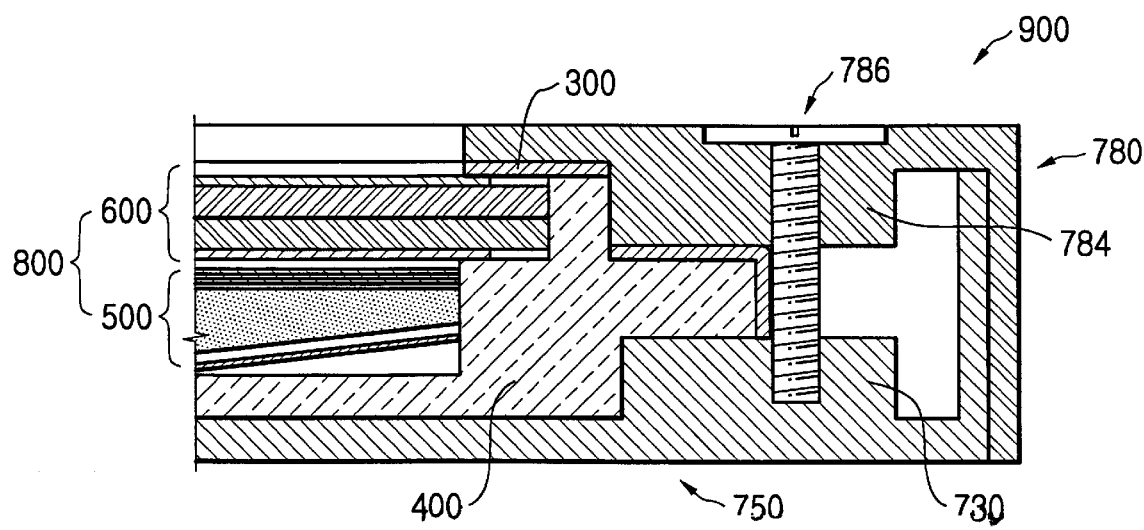
FIG. 14 is a view showing the combined state of FIG. 13.

Here, the through hole 784 of the front case boss 782 and the hollow of the rear case boss 730 are aligned with each other on a straight line when the front case 780 and the rear case 750 are combined with each other, and a part of the top surface of the front case boss 782, other than the through hole 784, presses the surface of the first locking depression 410. More specifically, as shown in FIGS. 12, 13 and 14, the second locking depression 420 of the LCD module 800 is aligned with the rear case boss 730 of the rear case 750 such that the LCD module 800 is combined with the rear case 750, being temporarily secured thereto. By doing so, the horizontal movement of the LCD module 800 is restricted by the rear case boss 730.

In this state, the rear case 750 in which the LCD module 800 is temporarily accommodated is combined with the front case 780 while the front case boss 782 and rear case boss 730 are aligned with each other, with the inner bottom of the front case 780 facing the LCD module 800, as shown in FIGS. 13 and 14. Here, the part of the front case boss 782, other than the through hole 784, presses the first locking depression 410 of the LCD module 800 while the front case 780 and the rear case 750 are combined with each other. Simultaneously, the fastening screw 786, being inserted through the through hole 782 of the front case boss 782 from the outside of the front case 780, passes through the through hole 782 and then is fitted in the hollow 735 of the rear case boss 730 while the through hole 784 of the front case boss 782 is aligned with the hollow 735 of the rear case boss 730 on a straight line.

Figure 15:
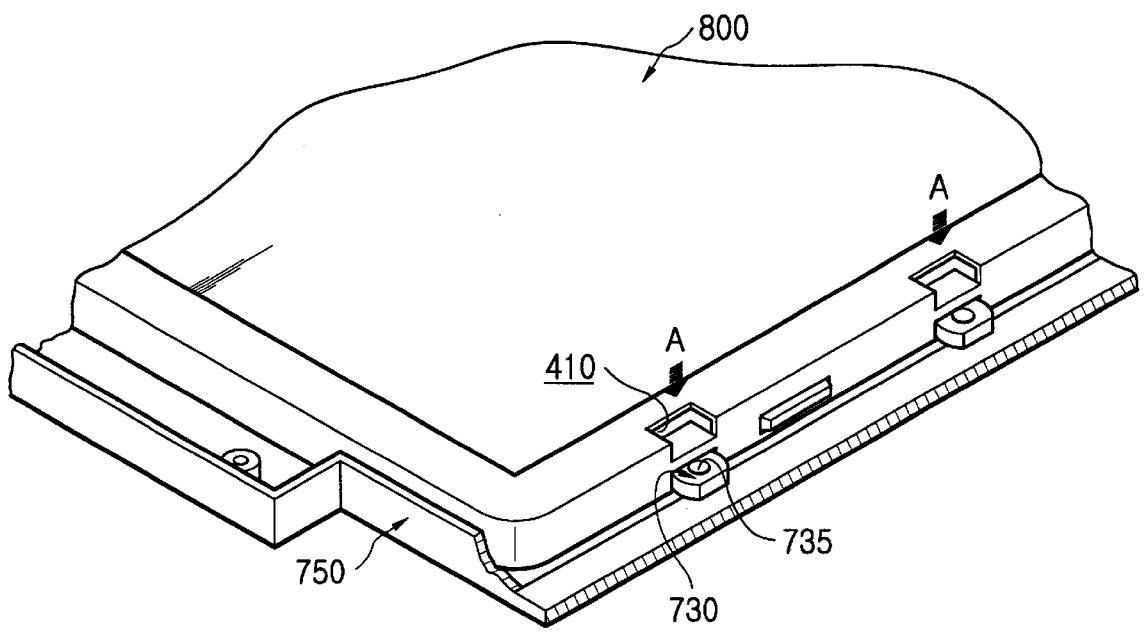
FIG. 15 is a partial perspective view showing the combination of the LCD module and the rear case in accordance with another embodiment of the present invention.

Another embodiment of the present invention is explained hereinafter with reference to FIGS. 15, 16 and 17. Referring to FIG. 15, the first and second locking depressions 410 and 420 which respectively have the same positions and shapes as those in the above-described embodiment are formed at predetermined portions of the LCD module 800, and the rear case 750 has the rear case boss 739 combined with the second locking depression 420. Here, the hollow 735 formed at the rear case boss 730 is exposed to the outside of the second locking depression 420 when the rear case boss 730 has been combined with the second locking depression 420 of the LCD module 800.

A part of the rear case boss 730 having the above shape is inserted in the second locking depression 420 of the LCD module 800, such that the LCD module 800 is temporarily fixed to the rear case boss 730. Thus, the horizontal movement of the LCD module 800 on the bottom of the rear case 750 is restricted. However, the LCD module 800 can move upward from the bottom of the rear case 750 because the rear case boss 730 cannot block the LCD module 800 from being vertically moved though it can restrict its horizontal movement.

To prevent the upward movement of the LCD module 800 as well as its horizontal movement, the LCD module 800 is fixed between the rear case 750 and the front case 780. This is achieved by the construction of the front case 780 shown in FIG. 16. Referring to FIG. 16, a front case locking protrusion 790 is formed at the inner sides of the front case 780, which oppose the LCD module 800. The front case locking protrusion 790 is located opposite to the rear case boss 730 while the second locking depression 420 of the LCD module 800 is combined with the rear case boss 730 of the rear case 750 and the front case 780 is aligned to be capable of being mated with the rear case 750.

More specifically, the locking protrusion 790 consists of a first locking protrusion 792 having a predetermined height and plane area, and a second locking protrusion 794 of which is projected from the center of the top of the first protrusion 792 and has a plane area smaller than that of the first protrusion 792. The second locking protrusion 794 has its sectional area capable of being inserted into the hollow 735 of the rear case boss 730 and a predetermined height. The top of the first locking protrusion 792 presses the first locking depression 410 of the LCD module 800. The second locking protrusion 794 is inserted in the hollow 735 of the rear case boss 730 while the first locking protrusion 792 presses the first locking depression 410. Here, it is preferable that the second locking protrusion 794 is fitted in the hollow 735 of the rear case boss 730 with a very small margin tolerance.

To press the first locking depression 410 by the first locking protrusion 792, only a part of the first locking protrusion 792 is needed to come into contact with a part of the first locking depression 410 but the remaining portion where they do not come into contact with each other is not required. Thus, this unnecessary portion is cut for which should have been removed, such that the area of the locking protrusion 790 is reduced.

While the LCD module is mounted on a predetermined position of the rear case as described in the above embodiment and the front case 780 is aligned such that the rear case 750 is inserted therein, the first locking protrusion 792 presses the first locking depression 410 and the second locking protrusion 794 is fitted in the hollow 735 of the rear case boss 730 to fix the LCD module 800 between the front case 780 and the rear case 750 and then the front case 780 and rear case 750 are combined with each other by means of fastening screws, accomplishing the LCD apparatus.

In accordance with the aforementioned embodiment shown in FIGS. 10 to 14, the LCD module 800, being aligned at a predetermined position of the rear case 750, is fixed between the front case 780 and the rear case 750 while the two cases are fastened to each other by the fastening screw 786 so that the process of packaging the LCD module 800 in the case 700 becomes simple. In addition, reliability in packaging of the LCD module 800 is maximized because the LCD module can be pressed by relatively wide area of the case. This embodiment is considerably effective when it is difficult to form the through hole or connection hole into which the front case boss 784 will be inserted at the mold frame 400 due to very thin frame for realizing light and small mold frame 400 of the LCD module 800.

Figure 16:
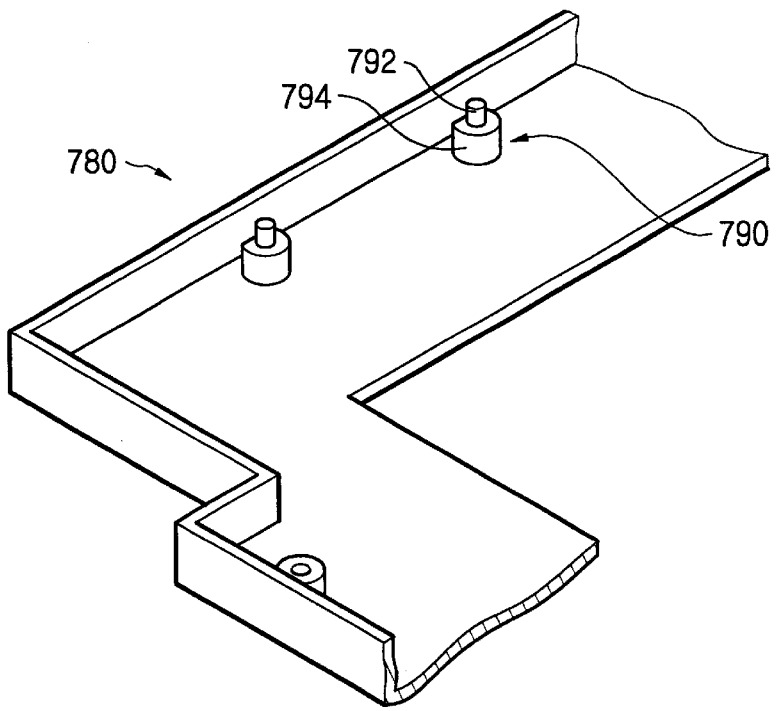
FIG. 16 is a back view of the front case combined with the structure of FIG. 15.
Figure 17:
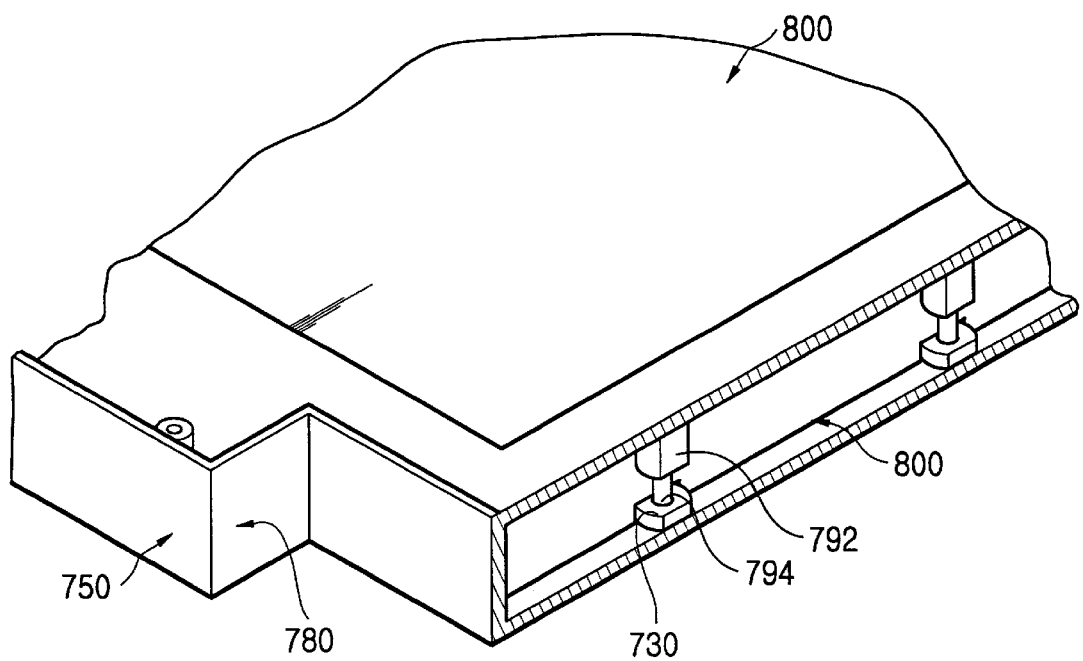
FIG. 17 is a partial perspective view for explaining the state that the front case is combined with the rear case to which the LCD module is secured.

Meantime, in accordance with the embodiment shown in FIGS. 15, 16 and 17, the first locking protrusion 794 of the front case 780 presses the first locking depression 410 of the LCD module 800 and the second locking protrusion 732 thereof is fitted in the hollow 735 of the rear case boss 730 of the rear case 750 while the LCD module 800 is aligned at a predetermined position of the rear case 750, and then the front case 780 and the rear case 750 are fastened to each other by means of screws, to thereby simplify the process of packaging the LCD module 800 in the case 700. Furthermore, the number of the fastening screws is reduced to result in a decrease in the number of components and processes required for packaging the LCD module.

Figure 8:
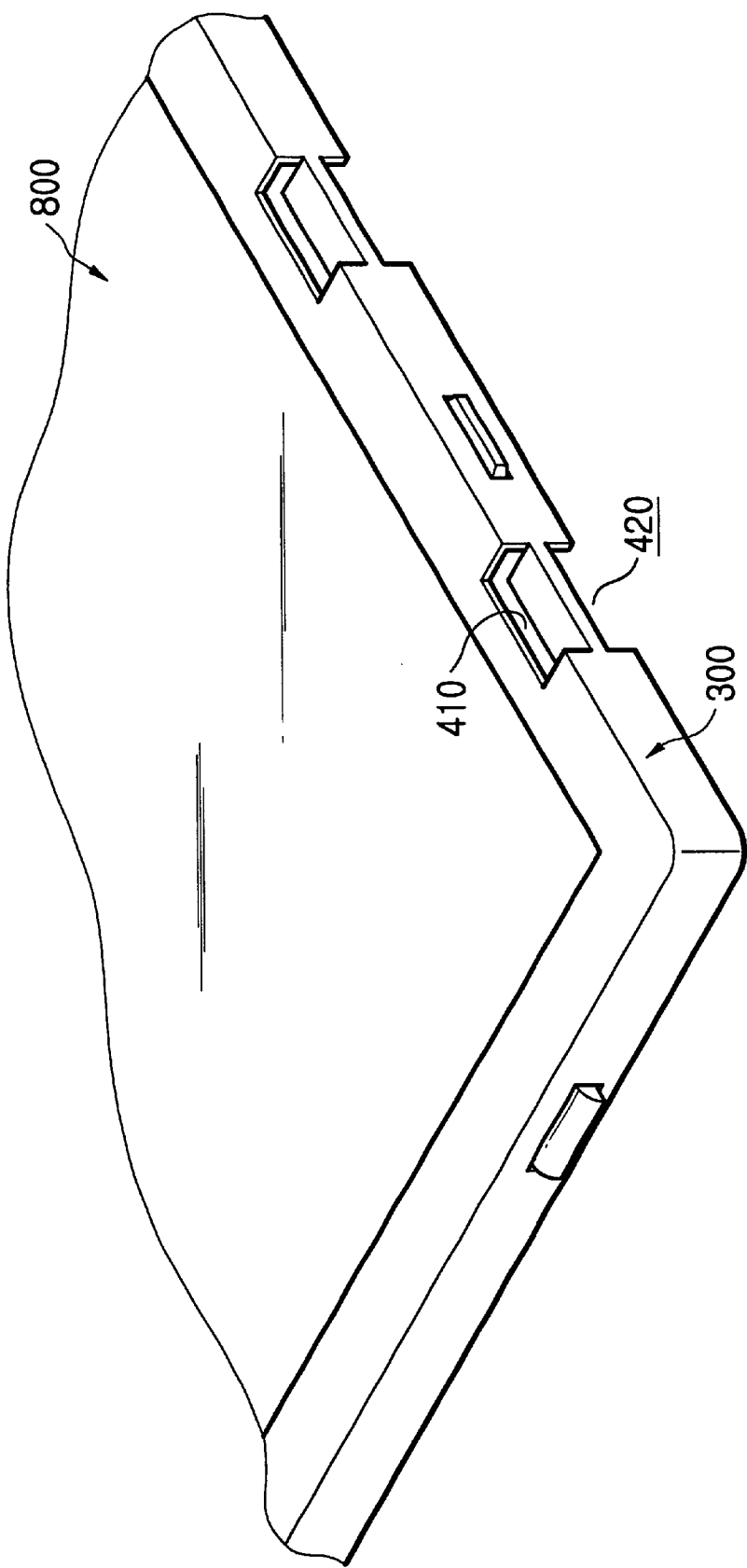
FIG. 8 is a perspective view of the combined state of FIG. 7.
Figure 18:
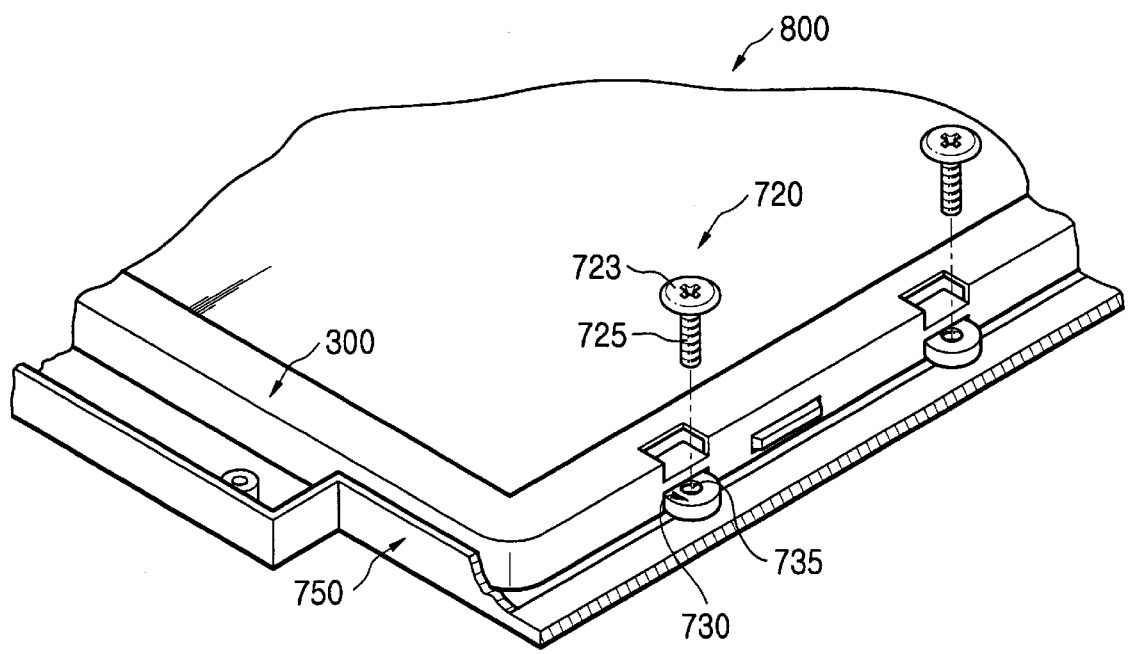
FIG. 18 is a perspective view showing another embodiment in which the LCD module of the invention is secured to the rear case while it is combined with the rear case.
Figure 19:
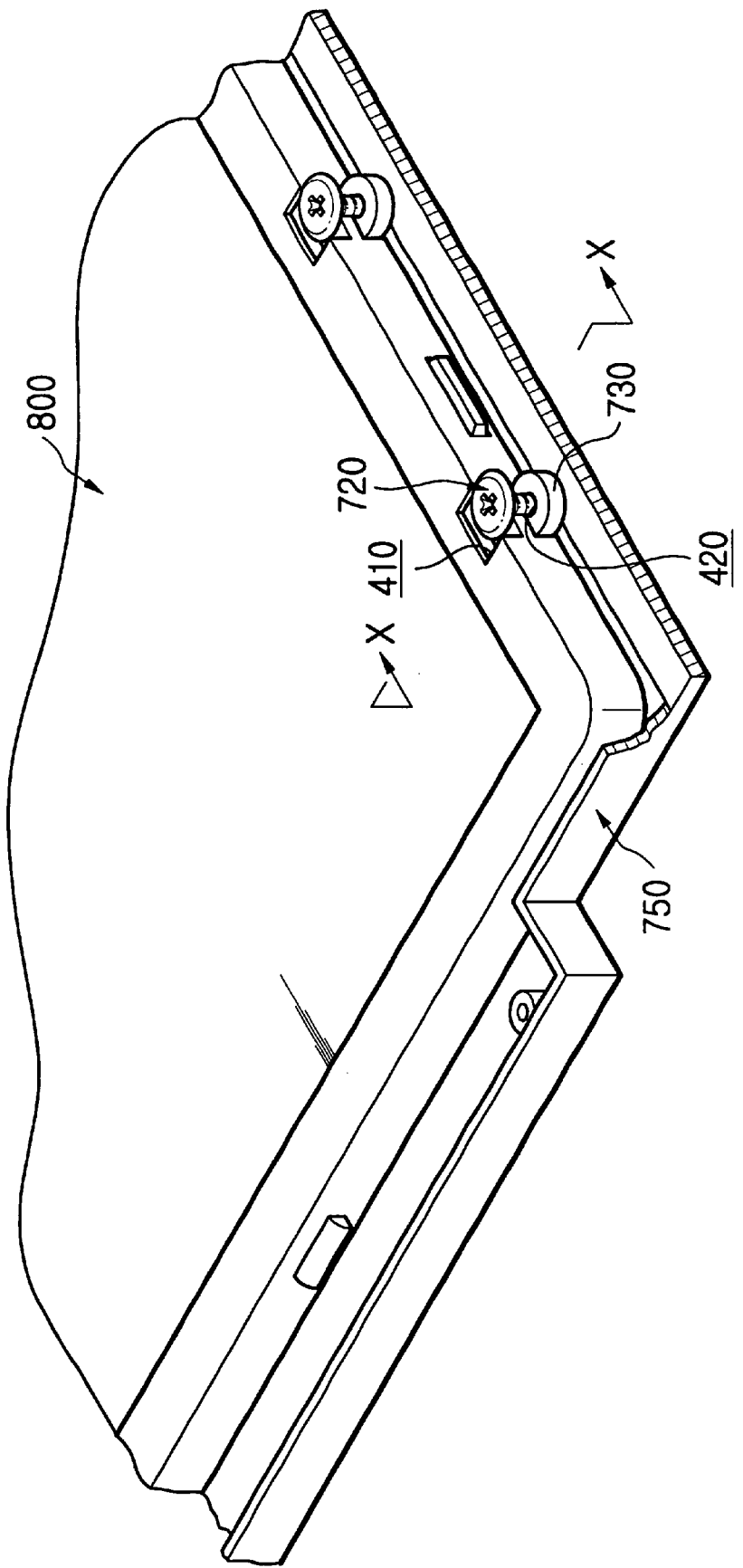
FIG. 19 is a perspective view showing a state in which a fastening screw is fastened to the structure of FIG. 18.
Figure 20:
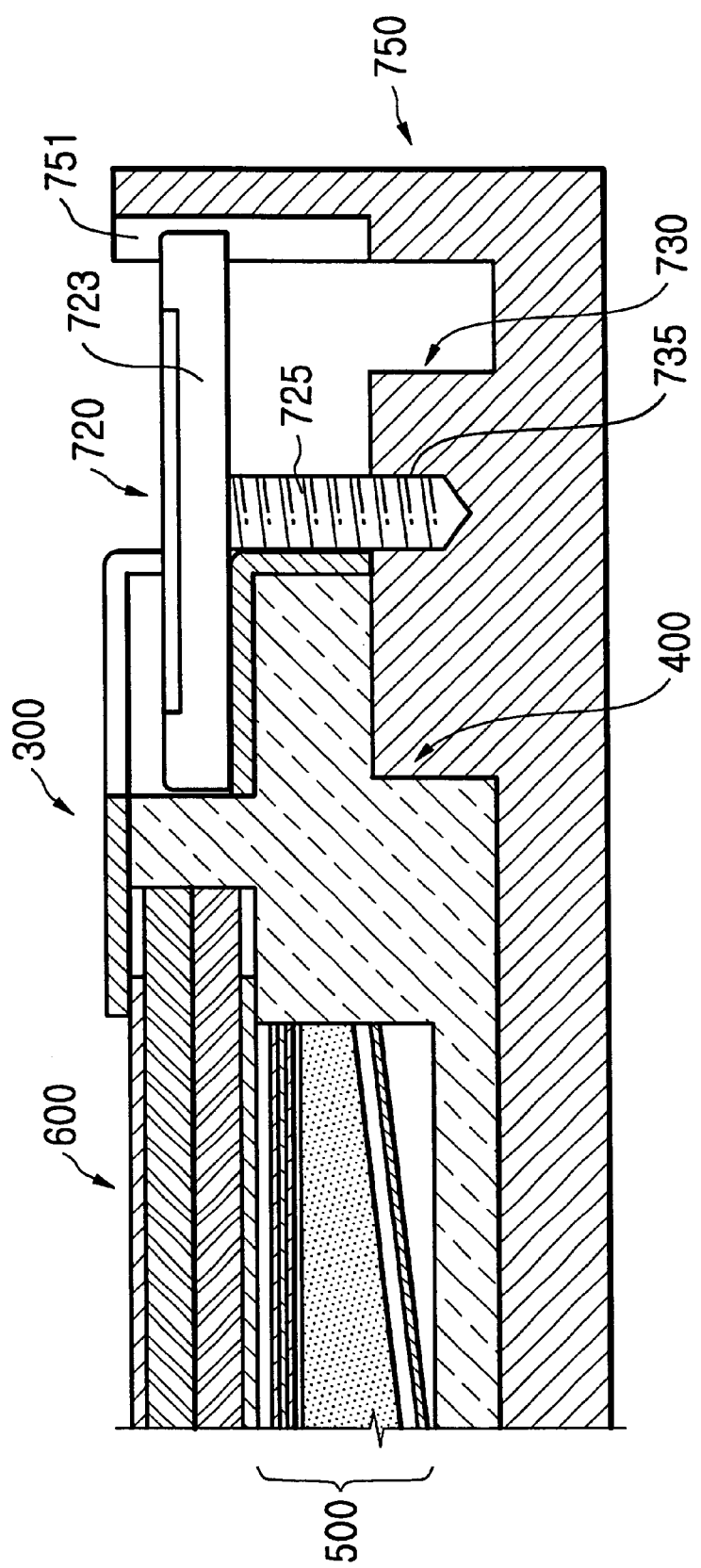
FIG. 20 is a cross-sectional view taken along the line X—X of FIG. 19.

FIGS. 18, 19 and 20 show another embodiment of the present invention. In this embodiment, since the LCD module has the same construction as that of the FIG. 8 and the rear case has the same construction as that described with reference to FIG. 9, explanation for these parts is omitted.

In state that the rear case boss 730 of the rear case 750 and the movement preventing depressions 420 of the LCD module 800 are combined with each other on the bottom of the rear case 740 such that the LCD module 800 cannot move horizontally thereon, a female screw is formed at the inner side of the hollow 735, as shown in FIGS. 18, 19 and 20, in order to prevent the LCD module 800 from moving upward from the bottom of the rear case 750. This female screw is combined with a fastening screw 720. The fastening screw 720 consists of a screw head 723 and a screw body 725 attached to the center of rotation of the screw head 723.

When the screw body 725 is inserted into the hollow 735 to be fastened thereto, the screw 720 is fit in the hollow 735 and the screw head 723 presses the locking depression 410 of the LCD to thereby fix the LCD module 800 to the bottom 740 of the rear case 750. Thus, the LCD module 800 cannot move in any direction on the bottom of the rear case 750.

In a case where the fastening screw 720 is inserted in the hollow 735, with almost half of the screw head 723 being superposed on the first and second locking depressions 410 and 420 which are formed between the signal processing/transmitting members 640 and 642 and their neighboring signal processing/transmitting members 640 and 642 of the display unit 600 mounted on the mold frame 400 of the mold frame 400 as described above, the screw head 723 of the fastening screw 720 directly presses the first locking depression 410 of the LCD module 800 with a considerably strong plane pressure to result in excellent reliability in combination of the LCD module 800 and the rear case 750 and rapid disassembling of them from each other. This embodiment corresponding to FIGS. 18, 19 and 20 can obtain a unique effect different from those achieved by the above-described embodiments shown in FIGS. 10 to 17.

Reference numeral 751 of FIG. 20 represents a rear case side hollow for minimizing the distance L ranging from the side of the LCD module 800 to the inner side of the rear case 750 by the screw head 723 of the fastening screw 720.

Figure 21:
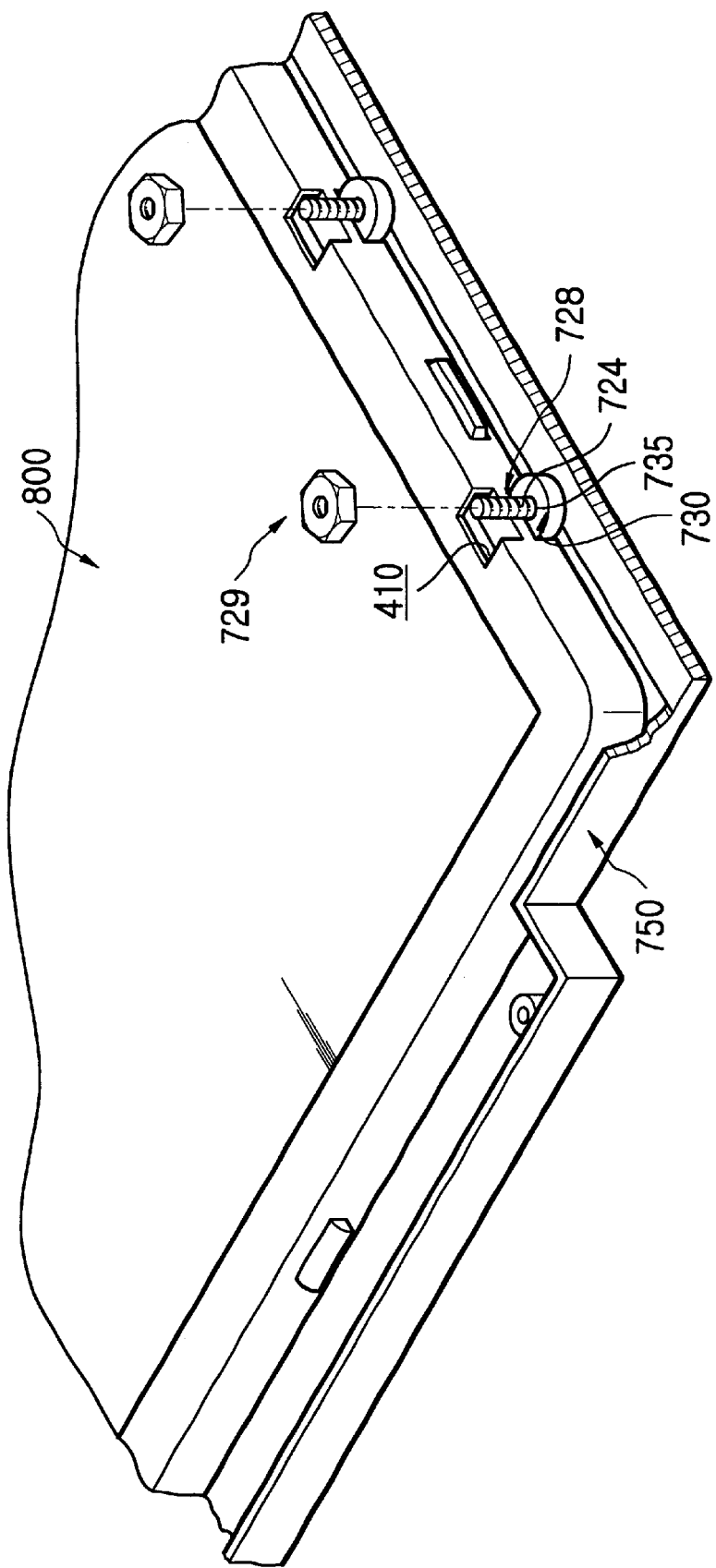
FIG. 21 is a perspective view for explaining, and further, another embodiment of the present invention.

FIG. 21 shows further another embodiment of the invention. Referring to FIG. 21, one end of a fastening screw 728 configured of only screw body 724 without having a screw head is fitted in the hollow 735 of the rear case boss 730 and the other end is protruded from the top of the boss 730 by a predetermined height. In this state, the protruded end is fit in a nut 729 having a female screw at the inner side thereof such that the nut 729 presses the first locking depression 410, thereby securing the LCD module 800 to the rear case 750. Here, the nut 729 is combined with the screw 728 by a separate tool.

The aforementioned embodiments of the invention have advantages which are more effective when it is difficult to combine the LCD module with the case because the side frame thickness of the mold frame 400 becomes so thin that it barely supports the constituent elements of the display unit 600 and the backlight assembly 500 for the purpose of minimizing the size of the LCD module 800.

Figure 22:
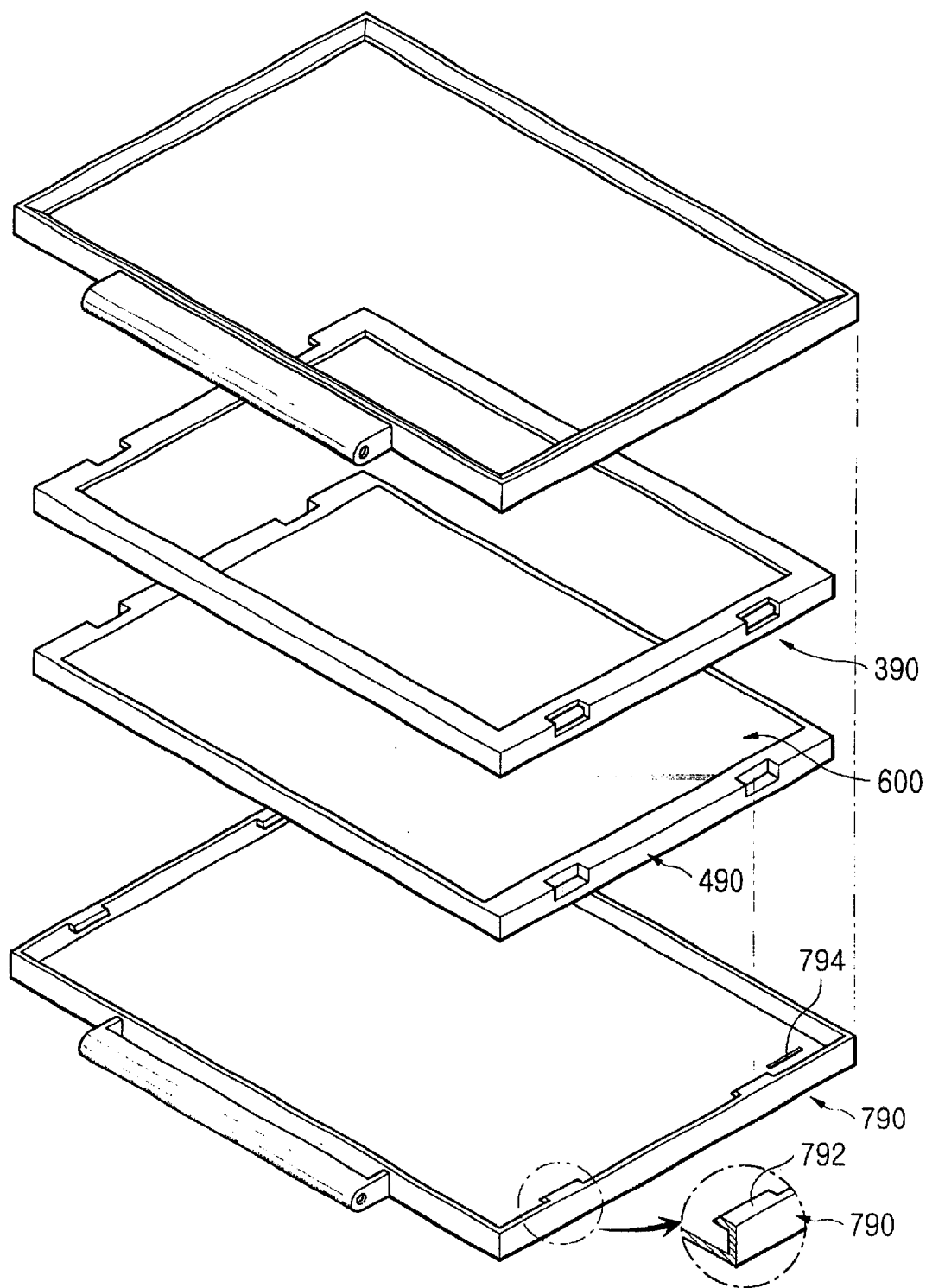
FIG. 22 is an exploded perspective view for explaining still another embodiment of the present invention.
Figure 23:
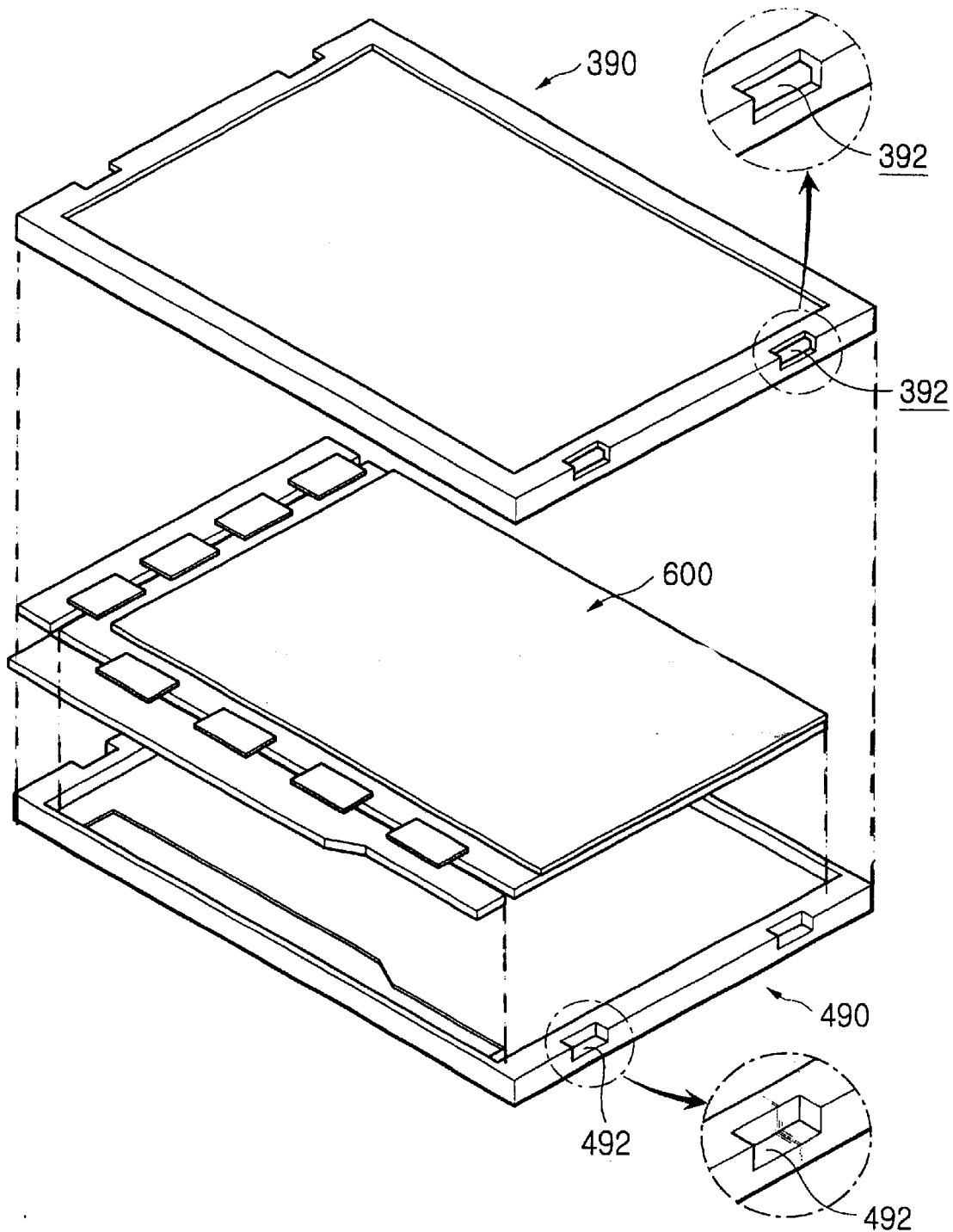
FIG. 23 is an exploded perspective view for explaining another embodiment of the present invention.

FIGS. 22 and 23 show another embodiment of the present invention. In this embodiment, since the display unit 600 has the same construction as that shown in FIG. 4, it is not described in detail and the connection relationship among a mold frame 490, a chassis 390 and a rear case 790 accommodating the display unit 600 is explained below.

As shown in FIG. 23, the chassis 390 has at least one opening 392 with a predetermined area at the L-shaped bent portion thereof. A portion of the mold frame 490, exposed through the opening 392 when the chassis 390 is combined with the mold frame 490, that is, a portion of the edge of the mold frame 490, has a depression having the same area as that of the opening 392. This depression is called hereinafter a locking depression 492 of the mold frame. This locking depression 492 of the mold frame 490 is mated with a locking protrusion 792 of the rear case 790 which will be described below.

The LCD module having the chassis 390, the display unit 600 and the mold frame 490 combined with one another is accommodated in the rear case 790 shown in FIG. 22. Here, the locking protrusion 792 is projected at a portion of the rear case 790, corresponding to the locking depression 492 of the mold frame, in order to prevent the LCD module from being disassembled from the rear case 790. Each locking protrusion 792 corresponds to each locking depression 492. In a case where the LCD module is pushed under the locking protrusion 792, the locking protrusion 792 presses the locking depression 492 of the mold frame so that the LCD module can be fitted between the bottom of the rear case 790 and the locking protrusion 792 more securely. Here, the surface of the locking protrusion 792 is chamfered that it is smoothly combined with the LCD module. In addition, the rear case 790 is constructed in such a manner that its sidewall changes the shape thereof to allow the locking protrusion 792 to be combined with the LCD module and the sidewall is recovered after combination of them. Reference numeral 794 denotes an aligmnent mark used for alignment of the LCD module when it is combined with the rear case 790.

While the preferred embodiments of the invention have been illustrated and described, it will be clear that the invention is not so limited. Numerous modifications, changes, variations, substitutions, and equivalents will occur to those skilled in the art without departing from the spirit and scope of the present invention as defined by the appended claims. For example, the LCD module may be combined with the rear case according to a fastening means other than the above-described screw one end of which is inserted in the hollow of the rear case boss and the other end of which presses the first and second locking depressions of the LCD module. Furthermore, the positions of the constituent elements of the rear case and the front case may be changed in such a manner that a recess or a through hole is formed at the first and second locking depressions, a fastening member or a screw is inserted in the recess or through hole and then the LCD module is locked in the rear case.

According to the present invention, in the LCD module in which a fastening protrusion combined with the rear case should be formed at the outer sides of the mold frame thereof because the mold frame has the considerably thin side frame thereof for making the LCD module lightweight and small, the locking depressions having a predetermined area are formed at the portion of the mold frame of the LCD module, corresponding to the space between the signal processing/transmitting members and their neighboring signal processing/transmitting members, located at the edge of the mold frame, and the LCD module is combined with the rear case using various means for pressing the locking depressions and, simultaneously, fixing the rear case. By doing so, the difference between the areas of the LCD module and the rear case is minimized to thereby maximize the effective display area of the LCD module and minimize the rear case area. This enables the realization of an LCD with a small size while having a large screen.

Moreover, in case where the means combined with the locking depressions of the mold frame and the rear case is formed at the front case, the LCD module is securely fitted between the rear case and the front case when the front case is combined with the rear case on which the LCD module is temporarily fastened, to remarkably reduce the number of components and processes required for packaging the LCD module in the case.

What is claimed is:

1. An LCD module, comprising:
    a display unit for displaying images by driving its liquid crystal;
    means for supplying light to the display unit;
    a container for accommodating the display unit and light supplying means, the container having at least one first locking depression formed at the edge of its top side; and
    a chassis combined with the display unit and the container, the chassis coming into contact with the top of the display unit and the outer side of the container, a portion of the chassis corresponding to the first locking depression being partially cut to expose the overall surface of the first locking depression, the partially cut portion being formed at the edge of the chassis,
    the combination of the chassis, the display unit and the container being formed so as to minimize a difference between areas of the combination and a case for accommodating the LCD module.

2. The LCD module of claim 1, wherein the container further has a second locking depression at the edge of its back side, the second locking depression being located corresponding to the first locking depression, and a portion of the chassis, corresponding to the second locking depression, is cut.

3. The LCD module of claim 1, wherein the first locking depression is combined with a part of a fastening means for fastening the case accommodating the LCD module.

4. The LCD module of claim 1, wherein the first locking depression is formed at a portion of the container to which the display unit does not extend.

5. The LCD module of claim 2, wherein the display unit comprises:
- an LCD panel including a color filter substrate, a TFT substrate on which a plurality of gate line groups and a plurality of data line groups are formed, and liquid crystal being inserted between the color filter substrate and the TFT substrate, each gate line group consisting of a plurality of gate lines, each data line group consisting of a plurality of data lines perpendicular to the gate lines, the TFT substrate being opposite to the color filter substrate;
- a signal processing/transmitting member consisting of a gate signal processing/transmitting member and a data signal processing/transmitting member, respectively connected to each gate line group and each data line group formed on the TFT substrate; and
- a driving printed circuit board connected to the signal processing/transmitting member, and
- wherein the first and second locking depressions are formed at portions of the container corresponding to a portion placed between the gate signal processing/transmitting members and a portion placed between the data signal processing/transmitting members.

6. The LCD module of claim 1, wherein the partially cut portion of the chassis, corresponding to the first locking depression, is bent to cover the first locking depression after it has been cut.

7. An LCD, comprising:
- an LCD module displaying information, the LCD module having at least one first locking depression formed at the edge of its topside;
- a rear case accommodating the LCD module, the rear case having an LCD module fastening boss, the fastening boss being protruded from the bottom of the rear case on which the LCD module is mounted by a predetermined height, the fastening boss having a hollow with a predetermined depth formed at its upper side; and
- a front case covering the surface of the rear case on which the LCD module is mounted, the front case having an LCD module fixing part for pressing the top of the first locking depression and a rear case fastening part fastening the LCD module fixing part to the LCD module while being fitted in the hollow of the LCD module fastening boss.

8. The LCD of claim 7, wherein the LCD module fixing part is a protrusion whose length is longer than the depth of the first locking depression, the protrusion having a surface area capable of being inserted in the first locking depression, a part of the protrusion being inserted in the first locking depression, and the rear case fastening part is a protrusion projected from the top of the LCD module fixing part to be fitted in the hollow.

9. The LCD of claim 7, wherein the LCD module fixing part is a boss having a through hole at its center portion and having a length longer than the depth of the first locking depression, the boss having a surface area capable of being inserted in the first locking depression, a part of the boss being inserted in the first locking depression, and the rear case fastening part is a fastening screw which is fastened to the through hole and the hollow.

10. The LCD of claim 7, wherein the LCD module further has a second locking depression formed at a portion of the edge of its back side, corresponding to the position of the first locking depression, a part of the LCD module fastening boss being inserted in the second locking depression such that the horizontal movement of the LCD module is restricted.

11. The LCD of claim 7, wherein the rear case has a position restricting rib which is projected from its inner side, opposite to the outer side of the LCD module, to press the outer side of the LCD module.

12. An LCD, comprising:
- an LCD module displaying information, the LCD module having at least one first locking depression formed at the edge of its topside;
- a rear case having an LCD module-fastening boss for the purpose of restricting the horizontal movement of the LCD module, the fastening boss having a locking protrusion projected from the bottom of the rear case by a predetermined height and a hollow formed at the upper side of the locking protrusion with a predetermined depth;
- a first fastening means a part of which presses the first locking depression and the other part of which would fit in the hollow to thereby fasten the LCD module to the rear case;
- a front case combined with the rear case; and
- a second fastening means for combining the rear case and the front case with each other.

13. The LCD of claim 12, wherein the first fastening means is a fastening screw consisting of a screw head and a screw body connected to the head, the screw head pressing the first locking depression, the end of the screw body being fitted in the hollow, and the second fastening means is at least one of a fastening screw or hook which combines the rear case and front case with each other.

14. The LCD of claim 12, wherein the first fastening means includes: a screw one end of which is fitted in the hollow and the other end of which has a male screw portion and is extended to the first locking depression; and a nut combined with the male screw portion to press the first locking depression, and the second fastening means corresponds to at least one of a fastening screw or hook, which combines the rear case and the front case with each other.

15. An LCD assembling method, comprising the steps of:
- placing an LCD module displaying information and having at least one first locking depression formed at the edge of its topside in a predetermined position of a rear case having an LCD module fastening part, to temporarily accommodate the LCD module in the rear case;
- temporarily fixing a front case to the rear case accommodating the LCD module, the front case simultaneously coming into contact with the first locking depression of the LCD module and the LCD module fastening part; and
- combining the front case and the rear case with each other by using a fastening means.

16. The LCD assembling method of claim 15, wherein the fastening means is formed at a portion of the front case, opposite to the LCD module fastening part, and includes a double protrusion which is fitted in the LCD module fastening part and simultaneously presses the first locking depression, and
the step of combining the front case and the rear case with each other comprises:
- a step in which the lower protrusion of the double protrusion presses the first locking depression of the LCD module and, simultaneously, its upper protrusion is fitted in the LCD module fastening part formed on the bottom of the rear case, to thereby temporarily fix the front case and the rear case to each other; and a step of combining the front case and the rear case with each other through said fastening means.

17. The LCD assembling method of claim 15, wherein the fastening means includes a front case boss formed at the inner side of the front case and a fastening screw combined with the LCD module fastening part, the front case boss having a through hole penetrating the front case, and the step of combining the front case and the rear case with each other by using the fastening means comprises the steps of:

accommodating the LCD module inside the rear case to fix it thereto temporarily; and pressing the locking depression by the front case boss temporarily fixed to the rear case and simultaneously inserting the fastening screw into the through hole of the front case boss to fit it in the LCD module fastening part.

18. The LCD assembling method of claim 15, wherein, in the step of placing the LCD module in the rear case, a second locking depression formed at a portion of the edge of the back side of the LCD module, corresponding to the position of the first locking depression, is aligned with a rear case boss which is formed at the rear case and a part of which is inserted in the second locking depression.

19. An LCD assembling method, comprising the steps of:

temporarily accommodating an LCD module displaying information in a rear case, the LCD module having at least one first locking depression formed at the edge of its topside in a rear case;

combining the LCD module and the rear case with each other by using a first fastening means a part of which presses the first locking depression and the remaining part of which is fixed to the bottom of the rear case; and combining the rear case with a front case by using a second fastening means.

20. The LCD assembling method of claim 19, wherein the first fastening means has a screw head and a screw body, the screw head pressing the first locking depression, the screw body being combined with a boss protruded from the bottom of the rear case, and the second fastening means is a fastening screw which combines the front case and the rear case with each other.

21. The LCD assembling method of claim 20, wherein the first fastening means consists of a screw one end of which is combined with the boss protruded from the bottom of the rear case and a nut which is fastened to the screw to press the locking depression, and the second fastening means is a fastening screw which combines the front case and the rear case with each other.

22. An LCD, comprising:

an LCD module which includes: a display unit for displaying images by driving its liquid crystal; a means for supplying light to the display unit; a container for accommodating the display unit and light supplying means, the container having at least one first locking depression formed at the edge of its top side; and a chassis combined with the display unit and the container, coming into contact with the top of the display unit and the outer side of the container, a portion of the chassis, corresponding to the first locking depression, being partially cut to expose the overall surface of the first locking depression, the partially cut portion being formed at the edge of the chassis; and a case consisting of a rear case and a front case, which are combined with each other, the rear case having a pressing means which presses the first locking depression after the LCD module is accommodated therein.

23. The LCD of claim 22, wherein the rear case has at least one alignment mark which is marked on the bottom thereof for alignment of the LCD module.

* * * * *